US012754064B2

(12) United States Patent
Tarumoto et al.

(10) Patent No.: US 12,754,064 B2
(45) Date of Patent: Oct. 6, 2026

(54) WEIGHING APPARATUS THAT DISPLAYS EVALUATION INFORMATION OF DIGITAL FILTER

(71) Applicant: ISHIDA CO., LTD., Kyoto (JP)

(72) Inventors: Yoshinori Tarumoto, Ritto (JP); Tomoya Maeno, Ritto (JP)

(73) Assignee: ISHIDA CO., LTD., Kyoto (JP)

(*) Notice: Subject to any disclaimer, the term of this patent is extended or adjusted under 35 U.S.C. 154(b) by 349 days.

(21) Appl. No.: 18/176,357

(22) Filed: Feb. 28, 2023

(65) Prior Publication Data

US 2023/0296424 A1 Sep. 21, 2023

(30) Foreign Application Priority Data

Mar. 16, 2022 (JP) ................................ 2022-041442

(51) Int. Cl.
*G01G 23/37* (2006.01)
*G01G 11/04* (2006.01)

(52) U.S. Cl.
CPC ........... *G01G 23/37* (2013.01); *G01G 11/046* (2013.01)

(58) Field of Classification Search
CPC ... G01G 11/046; G01G 23/37; G01G 23/3721
See application file for complete search history.

(56) References Cited

U.S. PATENT DOCUMENTS

| | | | | |
|---|---|---|---|---|
| 7,739,068 B2 * | 6/2010 | Reber | .................. | G01G 3/1414 177/185 |
| 12,241,775 B2 * | 3/2025 | Tarumoto | ............. | G01G 19/035 |
| 2007/0095123 A1 * | 5/2007 | Aikawa | .................. | G01G 23/10 73/1.35 |
| 2019/0280673 A1 * | 9/2019 | Higa | .................. | G05B 19/0423 |

FOREIGN PATENT DOCUMENTS

| | | | | |
|---|---|---|---|---|
| CN | 106104228 A | | 11/2016 | |
| CN | 107846205 A | * | 3/2018 | |
| CN | 111179257 A | | 5/2020 | |
| CN | 113493099 A | | 10/2021 | |
| EP | 3537242 B1 | * | 4/2020 | ......... G05B 19/0423 |
| EP | 3 121 570 B1 | | 4/2021 | |
| EP | 3 882 582 A1 | | 9/2021 | |
| JP | S63-309823 A | | 12/1988 | |
| JP | H08-062032 A | | 3/1996 | |
| JP | 2005-505956 A | | 2/2005 | |

(Continued)

*Primary Examiner* — Natalie Huls
(74) *Attorney, Agent, or Firm* — Spencer Fane LLP

(57) ABSTRACT

A weighing apparatus includes a conveyance unit configured to convey an article, a weighing unit configured to weigh weight of the article conveyed by the conveyance unit, a processing unit configured to process an original signal related to weighing, by a plurality of digital filters set in advance, the original signal being output from the weighing unit, and a display unit configured to display information output from processing unit, in which the processing unit is configured to generate evaluation information for each digital filter to be applied, based on a result of sequentially applying the plurality of digital filters to the original signal that is output when the conveyance unit is in operation and the article is not conveyed by the conveyance unit, and the display unit is configured to display at least one of the evaluation information.

3 Claims, 5 Drawing Sheets

(56) References Cited

FOREIGN PATENT DOCUMENTS

| | | | |
|---|---|---|---|
| JP | 5901126 | B2 | 4/2016 |
| JP | 5960939 | B2 | 8/2016 |
| JP | WO2015-141670 | A | 4/2017 |
| JP | 2017-198665 | A | 11/2017 |
| JP | 2019-159483 | A | 9/2019 |
| JP | 2001-265848 | A | 9/2021 |
| JP | 2021-148661 | A | 9/2021 |
| JP | 2021-148718 | A | 9/2021 |
| KR | 20210117939 | A | 9/2021 |
| WO | 03/001797 | A1 | 1/2003 |
| WO | 2015/141670 | A1 | 9/2015 |

* cited by examiner

WEIGHING APPARATUS THAT DISPLAYS EVALUATION INFORMATION OF DIGITAL FILTER

TECHNICAL FIELD

The present disclosure relates to a weighing apparatus.

BACKGROUND

As an example of a weighing apparatus, an apparatus for weighing the weight of an article (an object to be weighed) that is conveyed by a transport conveyor can be given. Republished Japanese Translation No. WO2015-141670 of the PCT International Publication for Patent Application discloses a weighing apparatus including a weighing unit that outputs an original signal corresponding to the weight of a weighed article, a filter unit that performs filtering processing on the original signal output from the weighing unit, and a controller that causes a display unit to display a waveform of a weighing signal after the filtering processing.

SUMMARY

In the weighing apparatus as described above, there is a case where a plurality of digital filters are set in advance in the filter unit. In this way, the weight of the article can be accurately weighed by setting a digital filter suitable for the conditions of the weighing apparatus and the surroundings thereof. However, the setting of the digital filter is difficult for a mere user of a weighing apparatus. For this reason, usually, there is a problem in that it is necessary to perform the setting of the digital filter by a designer or an expert of the weighing apparatus.

In view of the above problem, it is conceivable that a weighing apparatus itself automatically sets a digital filter. In this case, there is a concern that the automatically set digital filter may not be optimal for the conditions of the weighing apparatus and the surroundings thereof.

An object of an aspect of the present disclosure is to provide a weighing apparatus in which the accuracy of an automatic setting result of a digital filter can be improved.

A weighing apparatus according to an aspect of the present disclosure includes a conveyance unit configured to convey an article, a weighing unit configured to weigh weight of the article conveyed by the conveyance unit, a processing unit configured to process an original signal related to weighing by a plurality of digital filters set in advance, the original signal being output from the weighing unit, and a display unit configured to display information output from processing unit, in which the processing unit is configured to generate evaluation information for each digital filter to be applied, based on a result of sequentially applying the plurality of digital filters to the original signal that is output when the conveyance unit is in operation and the article is not conveyed by the conveyance unit, and the display unit is configured to display at least one of the evaluation information.

According to the weighing apparatus, the processing unit sequentially applies a plurality of digital filters to the original signal that is obtained when the conveyance unit is in operation and the article is not conveyed by the conveyance unit (during so-called idle operation). In this way, for example, one or more digital filters suitable for conditions of the weighing apparatus and the surroundings thereof (for example, vibration of the weighing apparatus itself, vibration that is transmitted from the outside to the weighing apparatus, and the like) can be automatically extracted. Here, the processing unit generates evaluation information for each digital filter to be applied, and the display unit displays at least one of the evaluation information. Therefore, an operator can easily select a digital filter suitable for the conditions of the weighing apparatus and the surroundings thereof, based on the evaluation information that is displayed on the display unit. By generating and displaying the evaluation information in this manner, the accuracy of the automatic setting result of the digital filter in the weighing apparatus can be improved.

The weighing apparatus may further include an input unit configured to accept input of a digital filter corresponding to one of the evaluation information displayed on the display unit. In this case, the operator can select a desired digital filter through the input unit.

The processing unit may be configured to compare a result of applying a default digital filter to the original signal with the result of sequentially applying the plurality of digital filters to the original signal, and to generate the evaluation information. In this case, it can be easily determined whether or not the plurality of digital filters are more appropriate than the default digital filter.

The evaluation information may be information indicating an influence of a noise component that is included in the original signal. In this case, the content that is indicated by the evaluation information can be easily read.

The display unit may be configured to distinguish and display the evaluation information for each filter characteristic. In this case, it becomes easier for the operator to select an appropriate digital filter.

The display unit may be configured to display the evaluation information, based on at least one of a character, a numeral, a graph, and a color. In this case, a plurality of evaluation information that are displayed on the display unit are easily compared with each other.

The processing unit may be configured to generate the evaluation information, based on a weighing signal that is obtained by applying each of the plurality of digital filters to the original signal.

According to an aspect of the present disclosure, it is possible to provide a weighing apparatus in which the accuracy of an automatic setting result of a digital filter can be improved.

DETAILED DESCRIPTION

Figure 1:
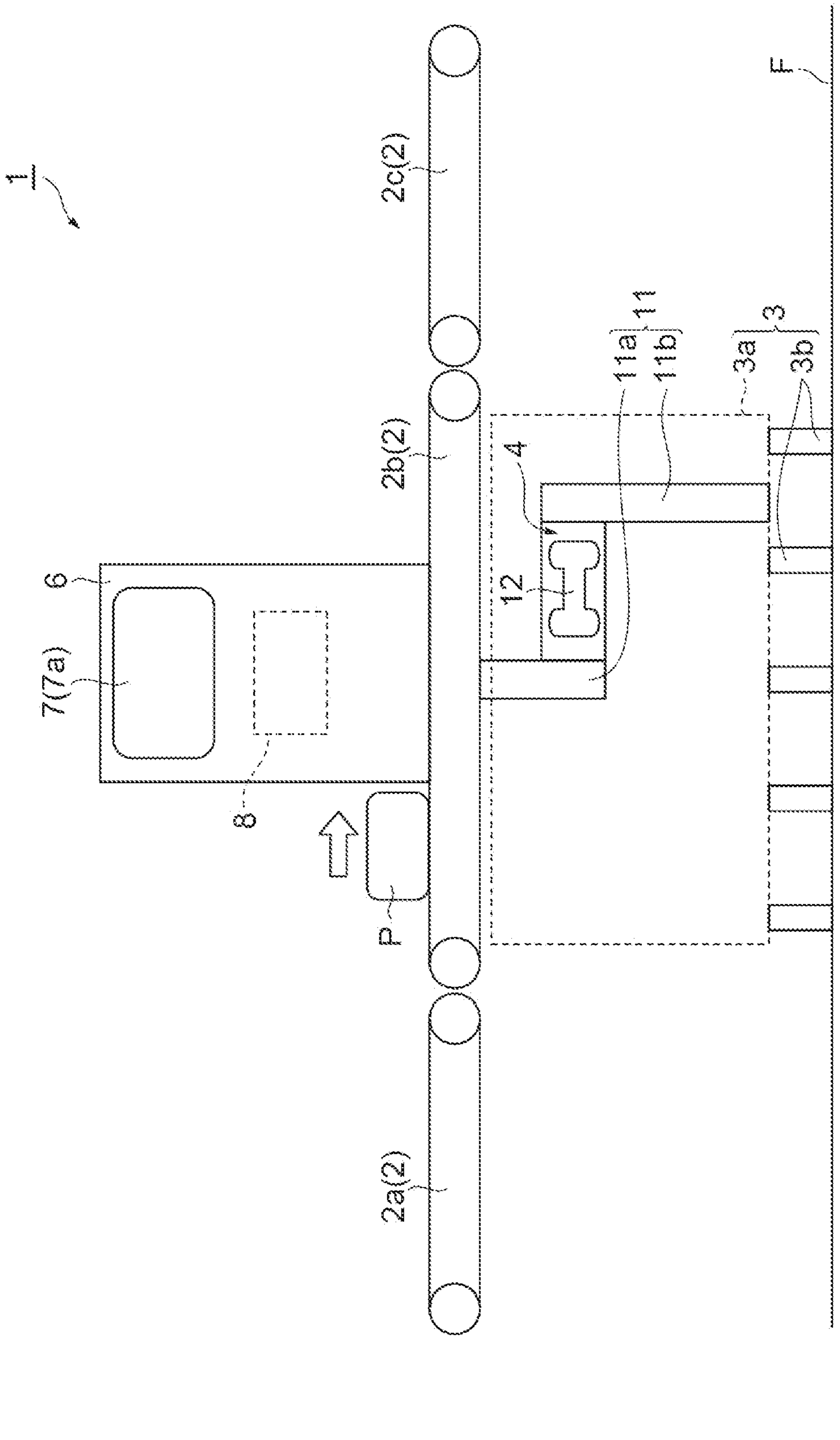
FIG. 1 is a schematic configuration diagram of a weighing apparatus according to an embodiment.

Hereinafter, an embodiment according to an aspect of the present disclosure will be described in detail with reference to the drawings. In each drawing, identical or corresponding parts are denoted by the same reference numerals, and overlapping description is omitted.

FIG. 1 is a diagram schematically showing a weighing apparatus according to the present embodiment. A weighing apparatus 1 shown in FIG. 1 is an apparatus for weighing an object to be measured while conveying it in the direction of an arrow in FIG. 1 (hereinafter, simply referred to as a "conveying direction"). The object to be measured is, for example, an article P extending along the conveying direction. The weighing apparatus 1 includes a conveyance unit 2, a frame 3, a weighing unit 4, and an operation unit 6.

The conveyance unit 2 is a conveyance device capable of conveying the article P along the conveying direction, and is, for example, a conveyor. The conveyance unit 2 conveys the article P at a conveyance speed designated through, for example, the operation unit 6.

The conveyance speed is designated through the operation unit 6. The conveyance unit 2 includes a first conveyor unit 2*a*, a second conveyor unit 2*b*, and a third conveyor unit 2*c*. The first conveyor unit 2*a*, the second conveyor unit 2*b*, and the third conveyor unit 2*c* are disposed in order from the upstream side in the conveying direction. The first conveyor unit 2*a* is a conveyor that carries the article P into the second conveyor unit 2*b*. The second conveyor unit 2*b* is a conveyor that carries the article P conveyed from the first conveyor unit 2*a* into the third conveyor unit 2*c*. The third conveyor unit 2*c* is a conveyor that carries out the article P from the second conveyor unit 2*b*.

The weighing unit 4 is mounted on the second conveyor unit 2*b*. Therefore, the article P that is conveyed by the conveyance unit 2 is weighed on the second conveyor unit 2*b*.

The frame 3 is a member that accommodates the weighing unit 4, and is fixed to a floor F below the conveyance unit 2. The frame 3 has a main body 3*a* that accommodates the weighing unit 4, and a plurality of legs 3*b* that are located between the main body 3*a* and the floor F. In FIG. 1, the main body 3*a* is shown by a broken line.

The weighing unit 4 is a member for weighing the weight of the article P located on the second conveyor unit 2*b*, and is located at the central portion of the conveyance unit 2. The weighing unit 4 includes a strain body 11 that receives compression and tension according to a load, and a weighing cell 12 that weighs the article P located on the second conveyor unit 2*b*. The strain body 11 has a movable rigid body part 11*a* that supports the second conveyor unit 2*b*, and a fixed rigid body part 11*b* that is fixed to the frame 3. One end of the movable rigid body part 11*a* is connected to an upstream-side end portion of the second conveyor unit 2*b*, and the other end of the movable rigid body part 11*a* is connected to the weighing cell 12. One end of the fixed rigid body part 11*b* is connected to the weighing cell 12, and the other end of the fixed rigid body part 11*b* is connected to the main body 3*a* of the frame 3. Although not shown in the drawing, in the weighing cell 12, a plurality of strain gauges attached to the strain body 11 are connected to a Wheatstone bridge circuit.

In the present embodiment, the weighing unit 4 has an A/D conversion unit, in addition to the strain body 11 and the weighing cell 12. The weighing cell 12 extracts an electric signal according to a load that is transmitted from the strain body 11 from the Wheatstone bridge circuit. This electric signal is an analog original signal indicating the weighing result of the article P by the weighing cell 12, and is obtained when the article P is located on the second conveyor unit 2*b*. This analog original signal is converted into a digital original signal by the A/D conversion unit. The weighing unit 4 uses the digital original signal as an original signal and outputs it to the outside. In this way, the amount of data of the original signal that is transmitted from the weighing unit 4 to the operation unit 6 can be reduced.

The operation unit 6 is a member for operating the conveyance unit 2 and the weighing unit 4, and is provided to be erect in the vicinity of, for example, the second conveyor unit 2*b*. The operation unit 6 has a display interface 7 and a controller 8.

The display interface 7 is a member (display unit) that displays an image based on display information that is output from the controller 8. In the present embodiment, the display interface 7 has a touch panel 7*a* that functions as an input unit that accepts input from the outside. When the display interface 7 accepts input from an operator (a user), input information indicating the content of the input is output to the controller 8. The input information is, for example, data relating to the conveyance speed of the conveyance unit 2, the type of the article P, the dimension of the article P along the conveying direction, the conveyance frequency of the article P, the weighing pitch of the article P, or the like. The conveyance frequency of the article P is set based on, for example, the capacity of a production machine that is located upstream of the weighing apparatus 1. The weighing pitch of the articles P is calculated by the controller 8, based on, for example, the conveyance speed of the conveyance unit 2, the above-mentioned dimensions of the articles P, and the conveyance frequency of the articles P.

The display interface 7 displays a weighing value indicating the weighing result (for example, a weighing result of the weight of the article P) by the weighing unit 4, weighing conditions of the weighing apparatus 1, a weighing signal that is obtained by performing filtering processing on the original signal, evaluation information of the filtering processing, and the like. The weighing value of the weight of the article P is data that is obtained based on the original signal (more specifically, the weighing signal) that is transmitted from the weighing unit 4 to the operation unit 6.

The filtering processing is processing of applying at least one of a plurality of digital filters stored in the controller 8 to the original signal. Each of the plurality of digital filters is composed of a low-pass filter that attenuates a frequency component exceeding a frequency determined in advance, a notch filter (band stop filter) that attenuates noise of the frequency of the rotating body included in the conveyance unit 2, and the like. Accordingly, a filter unit 22 can perform multistep filtering processing on the original signal. Each digital filter may include one or a plurality of low-pass filters, and one or a plurality of notch filters. Each of the plurality of digital filters may include low-pass filters that attenuate frequency bands different from each other, or may include notch filters that attenuate frequency bands different from each other. The plurality of low-pass filters may be, for example, the variable filters described in Japanese Patent No. 5901126.

A name, a serial number, a filter characteristic, and the like are assigned to each of the plurality of digital filters. The plurality of digital filters may be distinguished from each other by a serial number, a filter characteristic, or the like. The filter characteristic is a common property that is distinguished, for example, by the presence or absence of a specific filter (for example, a low-pass filter), the presence or absence of a combination of specific filters, or the presence or absence of use of a specific function, or the like, and is set in advance. As the filter characteristic, for example, a characteristic that is resistant to disturbances, a characteristic that is resistant to internal vibration, or the like can be given. For example, a digital filter having a specific filter may be set to have a filter characteristic that is resistant to disturbances, or may be set to have a filter characteristic that is resistant to internal vibration. The specific function is, for example, Anti Floor Vibration (AFV) or the like. The above filter characteristic or the like is assigned to each of the plurality of digital filters, so that the plurality of digital filters can be distinguished from each other under a predetermined condition.

The weighing condition may correspond to the input information, or may be a conveyance speed, a conveyance frequency, or the like, which is determined based on the input information. The weighing condition is displayed on the display interface 7, for example, at least before the evaluation information is generated. The weighing signal has, for example, a waveform arranged to calculate the weight of the article P. The weighing signal is displayed, for example, when confirming the details of the evaluation information that is displayed on the display interface 7.

The evaluation information that is displayed on the display interface 7 is information that is generated based on a weighing signal that is obtained by applying each of a plurality of digital filters to the original signal. For example, the evaluation information is information indicating the influence of a noise component that is included in the original signal, and is generated by using the standard deviation of the amplitude of the waveform that is included in the weighing signal, or the like. The evaluation information is generated for each of the plurality of digital filters. Therefore, the evaluation information corresponds to the evaluation result (scoring result) of each digital filter. In the present embodiment, the evaluation information is a standard value that is generated by comparing the result (initial result) of applying a default digital filter (default filter) to the original signal with the result of sequentially applying a plurality of digital filters to the original signal. The original signal for generating the evaluation information is, for example, a signal that is obtained when the conveyance unit 2 is in operation and the article P is not conveyed by the conveyance unit 2 (hereinafter also referred to as “during idle operation of the conveyance unit 2”). In this way, since variation in the weight of the article is not included in the evaluation information, it is possible to obtain an evaluation of the digital filter itself. In the present embodiment, the default filter corresponds to a digital filter that is set in advance in the initial state of the weighing apparatus 1. However, there is no limitation thereto. The default filter may be, for example, a digital filter applied to a previous inspection. The digital filter applied to the previous inspection corresponds to a digital filter used to calculate the weighing value of the article immediately before the latest evaluation result is generated.

For example, it is assumed that the initial result is the standard deviation of the amplitude of the waveform that is included in the weighing signal that is obtained by applying the default filter to the original signal. At this time, the standard deviation is used as default filter evaluation information (reference evaluation information) and normalized to be 100. Further, it is also assumed that the standard deviation of the amplitude of the waveform that is included in the weighing signal that is obtained by applying a predetermined digital filter to the original signal is ¼ of the initial result. In this case, the evaluation information for a predetermined digital filter can be expressed as a standard value of 25 by comparing it with the reference evaluation information. The display interface 7 displays the evaluation information, based on at least one of a character, a numeral, a graph, and a color (details will be described later). The evaluation information may vary according to the weighing conditions. Therefore, the evaluation information for a predetermined digital filter may vary according to the weighing conditions.

The controller 8 is a controller that controls each member included in the weighing apparatus 1 and is built in the operation unit 6. The controller 8 is a processing unit that not only controls each member included in the weighing apparatus 1 but also performs reception/calculation/transmission of various signals, and record/read or the like of various signals. As an example of the calculation of various signals by the controller 8, the derivation of the weighing result of the article P can be given.

Figure 2:
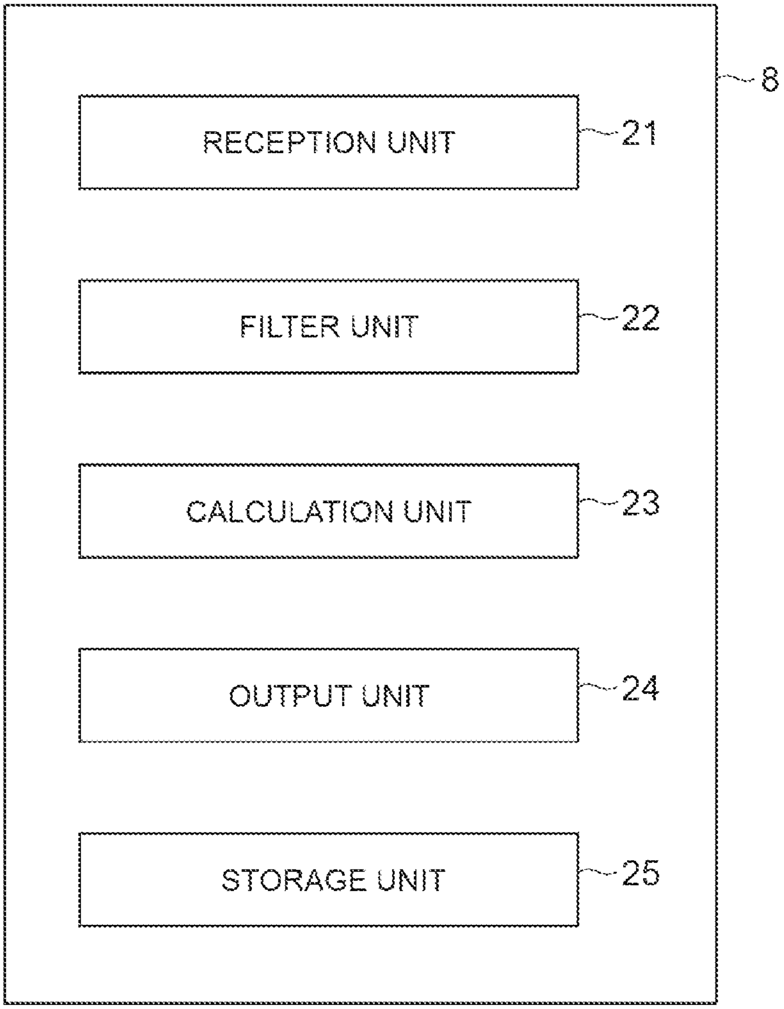
FIG. 2 is a diagram showing a functional configuration of a controller.

FIG. 2 is a diagram showing a functional configuration of the controller. As shown in FIG. 2, the controller 8 includes a reception unit 21, a filter unit 22, a calculation unit 23, an output unit 24, and a storage unit 25.

The reception unit 21 is, for example, a part that receives the original signal that is transmitted from the weighing unit 4 and the input information that is transmitted from the display interface 7. The reception unit 21 may receive data other than the original signal and the input information.

The filter unit 22 is a part that performs the filtering processing on the original signal that is output from the weighing unit 4 by using a plurality of digital filters set in advance. The filter unit 22 performs the filtering processing on the original signal by using one digital filter selected in advance from the plurality of digital filters during the operation of the conveyance unit 2 and during the conveyance of the article P. Then, the filter unit 22 outputs a signal (weighing signal) that is obtained by performing the filtering processing on the original signal.

The filter unit 22 sequentially applies a plurality of digital filters to the original signal obtained during the idle operation of the conveyance unit 2. In this way, the filter unit 22 generates a plurality of weighing signals that are the results of sequentially applying a plurality of digital filters to the original signal obtained during the idle operation of the conveyance unit 2. The plurality of digital filters that are applied in the filtering processing may be all the digital filters stored in the controller 8, or may be some digital filters. For example, a specific digital filter that is extracted according to a filter characteristic may be applied sequentially. In this way, digital filters unnecessary in the filtering processing can be removed in advance, so that the generation of evaluation information that becomes noise can be prevented.

In the present embodiment, information that is output from the weighing unit 4 when the conveyance unit 2 is idled under the scheduled weighing conditions designated through the display interface 7 corresponds to the original signal that is obtained when the conveyance unit 2 is in operation and the article P is not conveyed by the conveyance unit 2. Whether or not the conveyance unit 2 is in idle operation may be determined by the operator or may be determined automatically. For example, when the conveyance unit 2 is in operation and the non-detection state of an article detection sensor provided in the weighing apparatus 1 continues for a predetermined time or longer, or the like, it may be automatically determined that the conveyance unit 2 is in idle operation.

The calculation unit 23 is apart (a processing unit) that performs calculation processing on various input information. The calculation unit 23 performs calculation processing on the weight of the article P, based on the weighing signal that is output from the filter unit 22, during the operation of the conveyance unit 2 and during the conveyance of the article P. In this way, the calculation unit 23 generates the weighing value of the article P. The calculation unit 23 calculates the weighing pitch (weighing interval) of the article P according to the input conveyance speed of the conveyance unit 2, the dimensions of the article P, and the conveyance frequency.

The calculation unit 23 generates evaluation information for each digital filter to be applied, based on the result of sequentially applying a plurality of digital filters to the original signal obtained during the idle operation of the conveyance unit 2. In the present embodiment, the calculation unit 23 first generates evaluation information for each weighing signal, based on a plurality of weighing signals obtained during the idle operation of the conveyance unit 2. The calculation unit 23 then outputs these evaluation information to the output unit 24 and the storage unit 25.

The output unit 24 outputs, for example, various information and various signals that are generated in the controller 8, and various information and various signals that are stored in the storage unit 25 to the outside. The output unit 24 outputs, for example, the weighing value of the article P, the weighing conditions of the weighing apparatus 1, the evaluation information for each digital filter, and the like to the display interface 7 as display information.

The storage unit 25 stores the input information that is input through the display interface 7, and various information and various signals that are generated in the controller 8. The storage unit 25 stores the plurality of digital filters set in advance. The storage unit 25 stores each generated evaluation result in association with the generation date and time of the evaluation result. The operator can easily confirm the validity or the like of the setting of the weighing apparatus 1 at the generation date and time by confirming the stored evaluation result and the generation date and time.

Figure 3:
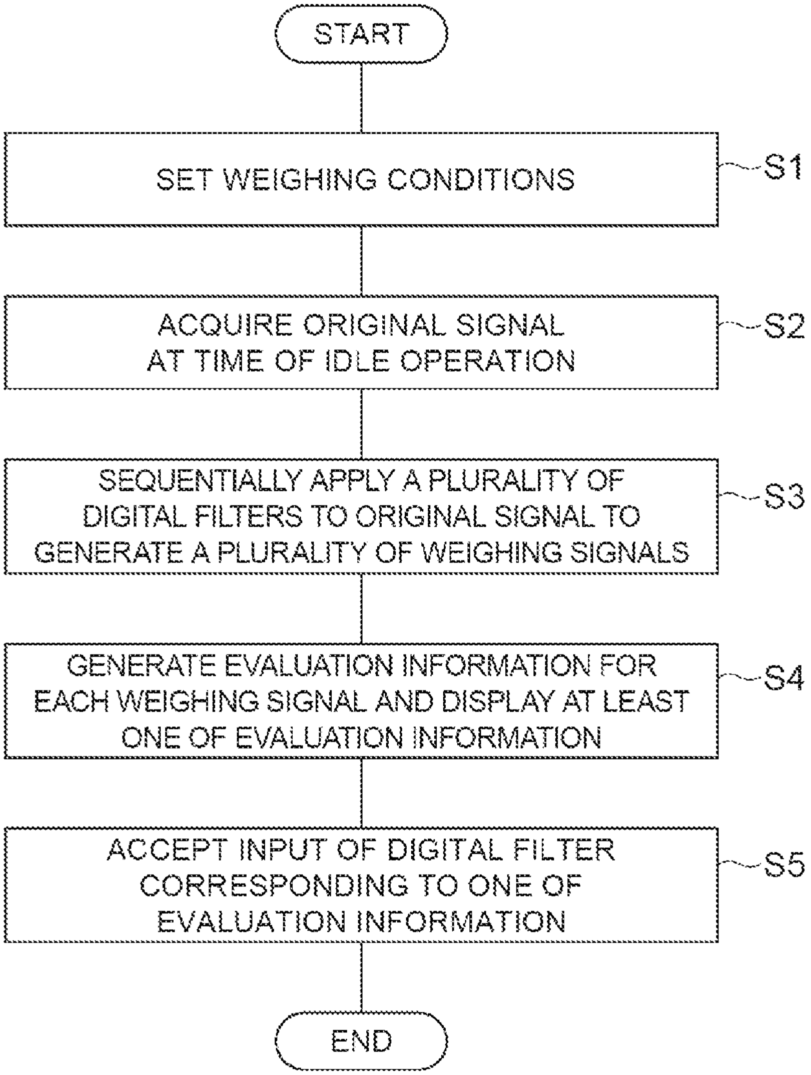
FIG. 3 is a flowchart for explaining a method of selecting a digital filter.

Next, an example of a digital filter selection method that is applied to the weighing apparatus 1 according to the present embodiment will be described with reference to FIG. 3. FIG. 3 is a flowchart for explaining the method of selecting a digital filter.

First, the weighing conditions of the weighing apparatus 1 are set (step S1). In step S1, first, the conveyance speed of the conveyance unit 2, the type of the article P, the dimension of the article P along the conveying direction, the conveyance frequency of the article P, and the like are set through the display interface 7. At least some of the weighing conditions may be automatically set or adjusted by the weighing apparatus 1. For example, when the operator selects the type of the article P through the display interface 7, the conveyance speed or the like of the conveyance unit 2 may be automatically set or adjusted. The set weighing conditions are displayed on the display interface 7, as described later.

Next, an original signal when the conveyance unit 2 is operated in a state where the article P is not conveyed (that is, at the time of the idle operation of the conveyance unit 2) is acquired (step S2). In step S2, for example, the weighing unit 4 acquires an original signal when the weighing apparatus 1 (particularly, the conveyance unit 2) is idled for about 5 seconds under the weighing conditions designated before weighing the article P.

Figure 4A:
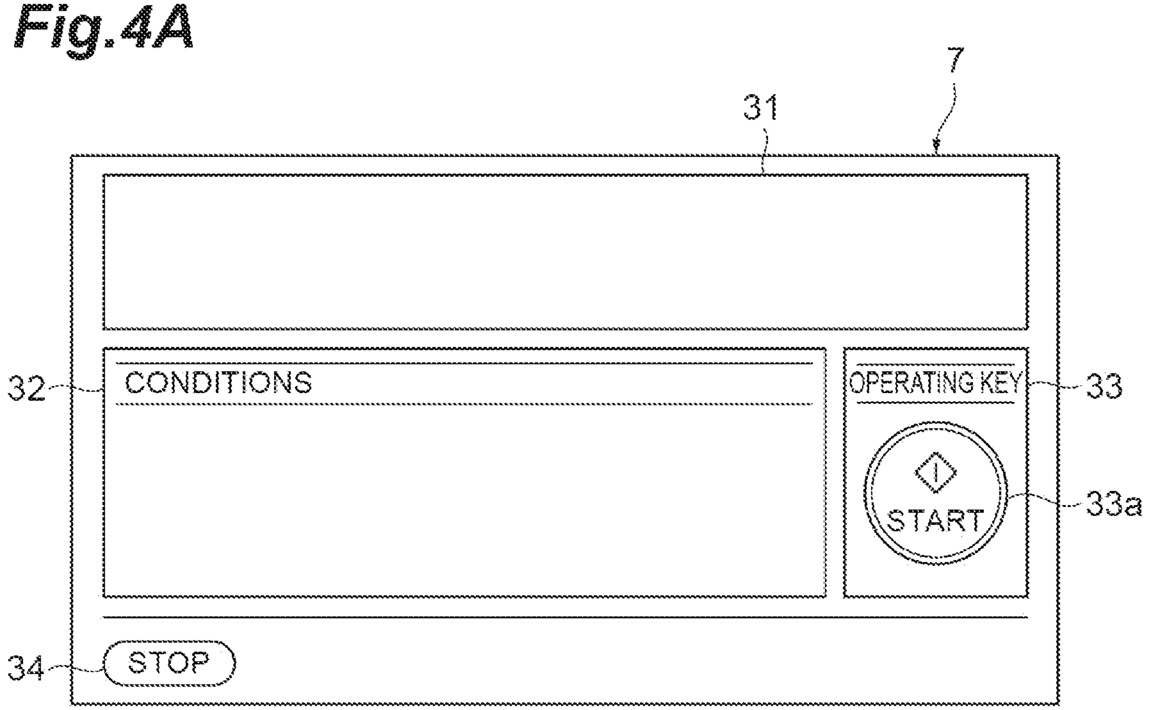
FIG. 4A is a diagram showing an example of a screen that is displayed on a display interface in step S3.

Next, a plurality of digital filters are sequentially applied to the acquired original signal to generate a plurality of weighing signals (step S3). In step S3, the filter unit 22 performs filtering processing on the original signal by sequentially applying a plurality of digital filters to the original signal. In this way, the filter unit 22 generates a plurality of weighing signals. FIG. 4A is a diagram showing an example of a screen that is displayed on the display interface in step S3. As shown in FIG. 4A, the display interface 7 includes a first display section 31, a second display section 32 that is located below the first display section 31, and a third display section 33 that is located below the first display section 31 and next to the second display section 32, and a stop button 34 that is located below the second display section 32. The first display section 31 is a portion that displays an image and/or characters indicating, for example, an explanation of step S3, a progress rate, and the like. The second display section 32 is a portion that displays the weighing conditions that are set in step S1. The third display section 33 is a portion that displays a start button 33*a* for instructing the weighing apparatus on the start of execution of step S3. For example, step S3 is started when the operator presses a start button 33*a*.

Figure 4B:
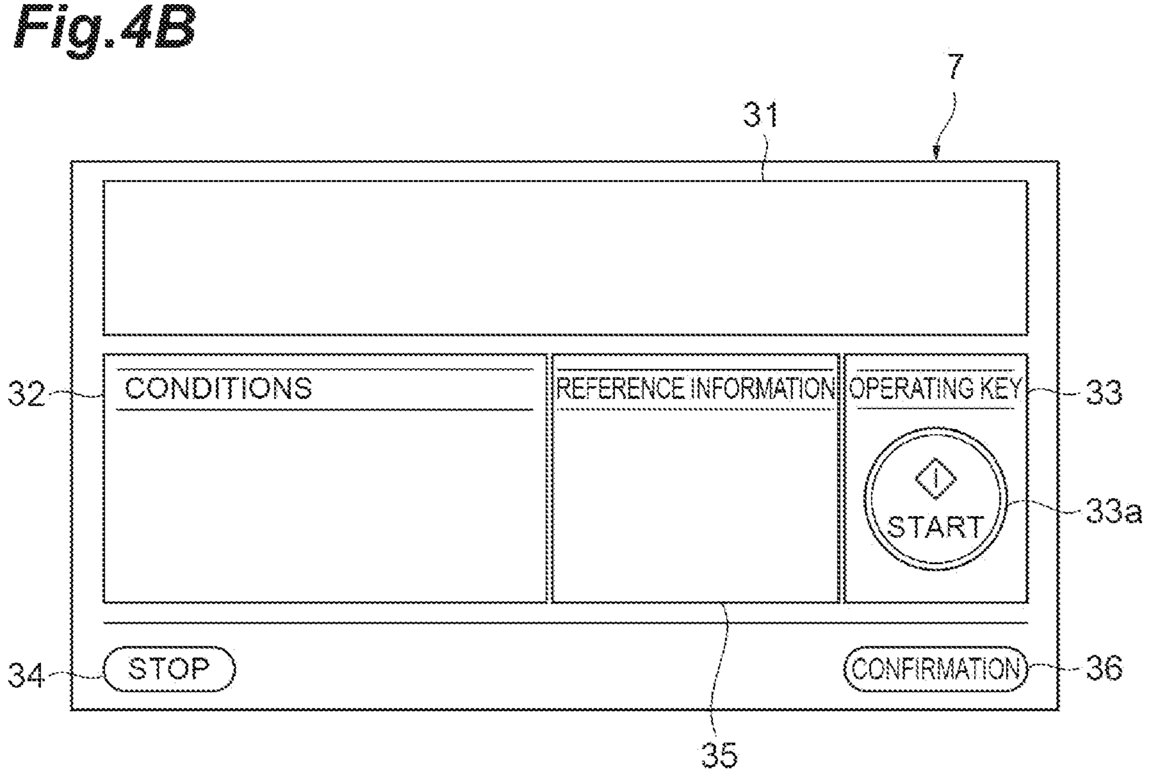
FIG. 4B is a diagram showing an example of a screen that is displayed on the display interface in step S4.

Next, evaluation information for each weighing signal is generated, and at least one of the evaluation information is displayed (step S4). FIG. 4B is a diagram showing an example of a screen that is displayed on the display interface in step S4. As shown in FIG. 4B, in step S4, the display interface 7 narrows the area of the second display section 32. Instead, in step S4, the display interface 7 displays a fourth display section 35 that is located between the second display section 32 and the third display section 33, and a confirmation button 36 that is located below the third display section 33. The fourth display section 35 is a portion that displays at least one of the generated evaluation information. In the present embodiment, the fourth display section 35 displays evaluation information that is automatically extracted according to the conditions in advance. In this way, the operator's burden of digital filter selection can be reduced. The fourth display section 35 may display reference evaluation information from the viewpoint of facilitating the determination of the validity of the evaluation information.

Figure 5A:
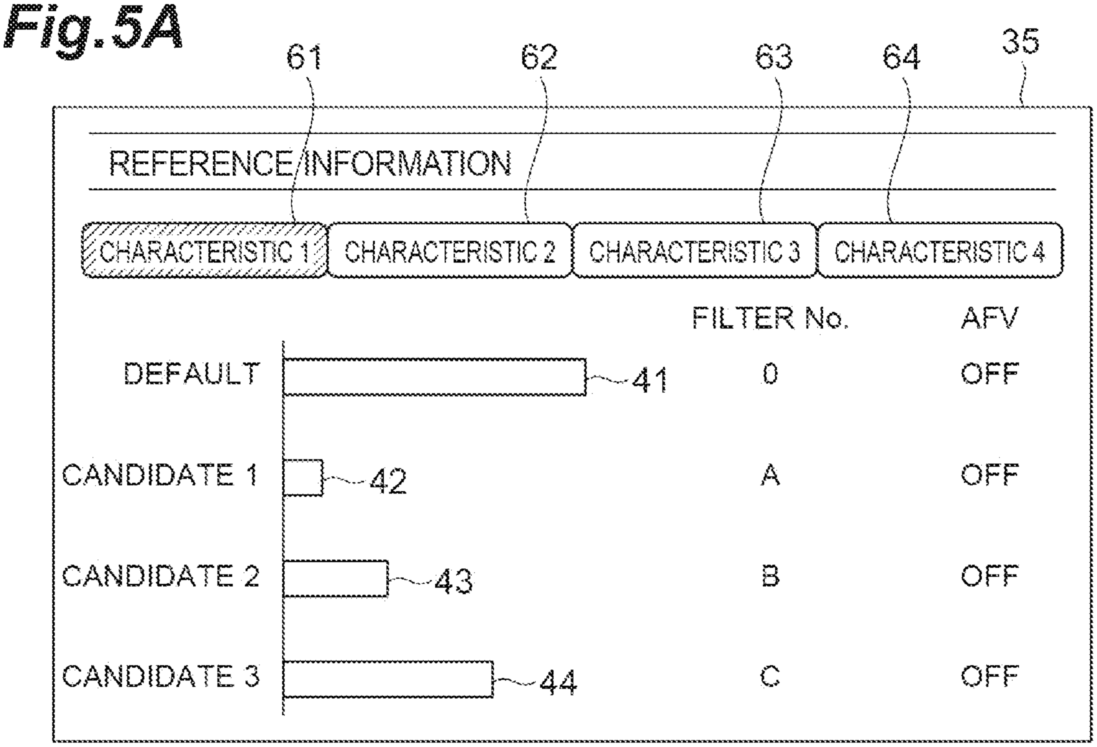
FIG. 5A is an enlarged diagram showing an example of a content that is displayed on a fourth display section.
Figure 5B:
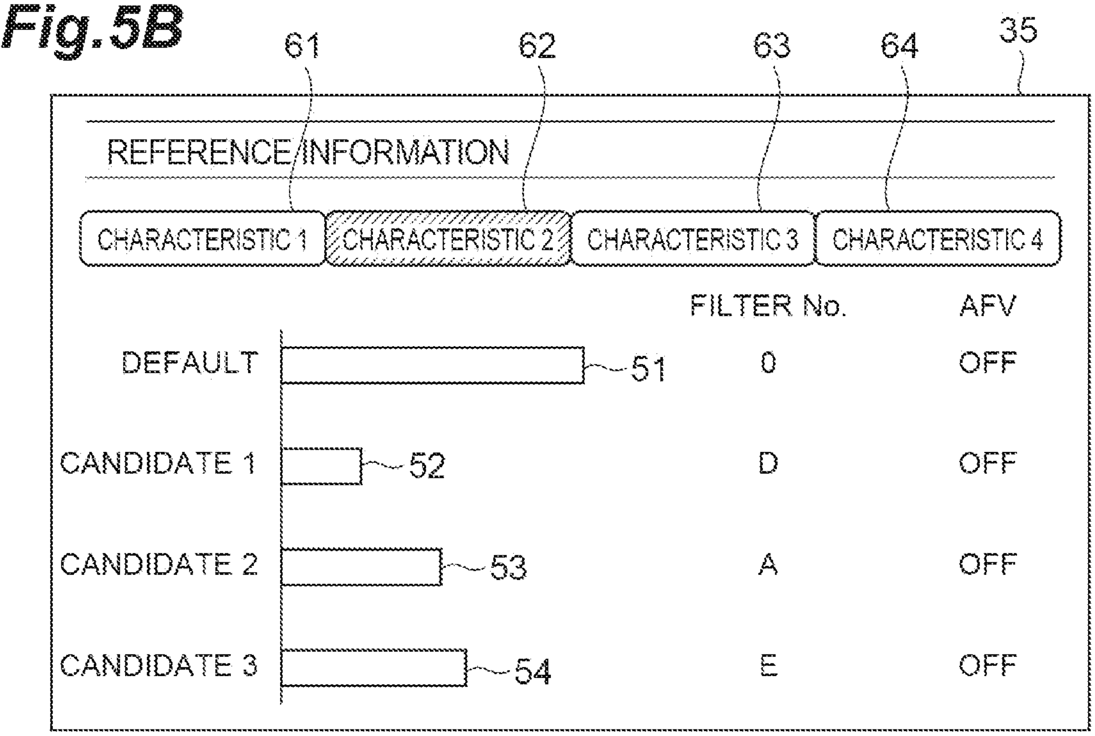
FIG. 5B is an enlarged diagram showing another example of the content that is displayed on the fourth display section.

FIG. A is an enlarged diagram showing an example of a content that is displayed on the fourth display section, and FIG. 5B is an enlarged diagram showing another example of the content that is displayed on the fourth display section. As shown in FIG. 5A, the fourth display section 35 displays a plurality of graphs 41 to 44 that are extracted according to a predetermined filter characteristic (Characteristic 1). The graph 41 shows evaluation information that is generated by applying a default filter (filter number: 0) to the original signal. The graph 42 shows evaluation information that is generated by applying a digital filter with a filter number: A to the original signal. The graph 43 shows evaluation information that is generated by applying a digital filter with a filter number: B to the original signal. The graph 44 shows evaluation information that is generated by applying a digital filter with a filter number: C to the original signal. Graphs corresponding to other evaluation results may be displayed by scrolling the display of the display interface 7.

As shown in FIG. 5B, a plurality of graphs 51 to 54 that are extracted according to a filter characteristic (Characteristic 2) different from the characteristic 1 are displayed. The graph 51 shows evaluation information that is generated by applying a default filter (filter number: 0) to the original signal. Therefore, the graph 51 can be said to be the same as the graph 41. The graph 52 shows evaluation information that is generated by applying a digital filter with a filter number of D to the original signal. The graph 53 shows evaluation information that is generated by applying a digital filter with a filter number of A to the original signal.

The graph 54 shows evaluation information that is generated by applying a digital filter with a filter number of E to the original signal.

Tabs 61 to 64 displaying predetermined filter characteristics are displayed on each of FIGS. 5A and 5B. Characteristics 1 to 4 are displayed on the tabs 61 to 64, respectively. The display interface 7 can distinguish and display the evaluation information for each filter characteristic by using the tabs 61 to 64. For example, when the operator presses the tab 62 in step S4, the display interface 7 displays the contents shown in FIG. 5B. Thereafter, when the operator presses the tab 61, the display of the display interface 7 is switched to the content shown in FIG. 5A. In this way, the operator can easily visually recognize the evaluation information that is distinguished for each filter characteristic.

In the present embodiment, the lower the elongation of the graph, the higher the displayed scoring result becomes. Therefore, in FIG. 5A, the graph 42 is interpreted as the highest evaluation, and in FIG. 5B, the graph 52 is interpreted as the highest evaluation. Each of the graphs 41 to 44 and 51 to 54 may be colored, or may be accompanied by numerical values. Further, the method of displaying the evaluation information by the display interface 7 is not particularly limited as long as the operator or the like can appropriately select the digital filter.

Returning to FIG. 3, the input of the digital filter corresponding to one of the evaluation information displayed on the display interface 7 is accepted (step S5). In step S5, for example, the operator selects one of the evaluation information displayed on the display interface 7. Then, when the operator presses the confirmation button 36, the digital filter that is applied to the weighing conditions set in step S1 is determined. With the above, the selection of the digital filter to be applied to the weighing apparatus 1 under the predetermined weighing conditions is completed.

According to the weighing apparatus 1 according to the present embodiment described above, the calculation unit 23 sequentially applies a plurality of digital filters to the original signal that is obtained during the idle operation of the conveyance unit 2. In this way, for example, one or more digital filters suitable for conditions of the weighing apparatus 1 and the surroundings thereof can be automatically extracted. Here, the calculation unit 23 generates evaluation information for each digital filter to be applied, and the display interface 7 displays at least one of the evaluation information. Therefore, the operator can easily select a digital filter suitable for the conditions of the weighing apparatus and the surroundings thereof, based on the evaluation information that is displayed on the display interface 7. By generating and displaying the evaluation information in this manner, the accuracy of the automatic setting result of the digital filter in the weighing apparatus 1 can be improved.

In the present embodiment, the weighing apparatus 1 includes the touch panel 7*a* that accepts input of a digital filter corresponding to one of evaluation information displayed on the display interface 7. Therefore, the operator can easily select a desired digital filter through the touch panel 7*a* while confirming the evaluation information that is displayed on the display interface 7.

In the present embodiment, the calculation unit 23 compares the result of applying a default digital filter to the original signal with the result of sequentially applying a plurality of digital filters to the original signal, and generates evaluation information. Therefore, it can be easily determined whether or not the plurality of digital filters are more appropriate than the default digital filter.

In the present embodiment, the evaluation information is information indicating the influence of a noise component that is included in the original signal. Therefore, the content that is indicated by the evaluation information can be easily read.

In the present embodiment, the display interface 7 distinguishes and displays the evaluation information for each filter characteristic. Therefore, it becomes easier for the operator to select an appropriate digital filter according to the filter characteristic.

In the present embodiment, the display interface 7 may display the evaluation information, based on at least one of a character, a numeral, a graph, and a color. In this case, a plurality of evaluation information that are displayed on the display interface 7 are easily compared with each other.

The embodiment of the weighing apparatus according to an aspect of the present disclosure has been described above. However, the aspect of the present disclosure is not limited to the above embodiment. For example, in the above embodiment, the evaluation information is generated based on the standard deviation of the amplitude of the waveform that is obtained by applying a digital filter to the original signal. However, there is no limitation thereto. For example, the evaluation information may be generated based on the standard deviation of the differential value of the amplitude of the waveform that is obtained by applying a digital filter to the original signal, or may be generated based on the standard deviation of the secondary differential value of the amplitude of the waveform.

In the above embodiment, in addition to the first display section to the third display section and the stop button, other display sections, buttons, or the like may be displayed on the display interface in step S3. Further, in step S4, the fourth display section is displayed instead of narrowing the area of the second display section. However, there is no limitation thereto. For example, the fourth display section that covers a part of the second display section or the like may be displayed, or the fourth display section may be displayed instead of narrowing the first display section. That is, in the above embodiment, the display area, size, position, or the like of each display section that is displayed on the display interface is not particularly limited.

In the above embodiment, the weighing unit uses a digital original signal as the original signal and outputs it to the outside. However, there is no limitation thereto. The weighing unit may use the acquired analog original signal as the original signal and output it to the outside. In this case, for example, the controller may digitally convert the analog original signal.

This application claims the priority benefit of Japanese Application No. JP2022-41442 filed on Mar. 16, 2022, the entire contents of which are incorporated herein by references.

What is claimed is:

1. A weighing apparatus comprising:

a conveyance unit configured to convey an article;

a weighing unit configured to weigh weight of the article conveyed by the conveyance unit;

a processing unit configured to process an original signal related to weighing by a plurality of digital filters set in advance, the original signal being output from the weighing unit;

a display unit configured to display information output from the processing unit; and a reception unit, wherein the processing unit is configured to generate evaluation information of the plurality of digital filters by comparing a result of applying a default digital filter to an original signal and a result of sequentially applying the plurality of digital filters to the original signal based on standard deviation of an amplitude of a waveform included in a weighing signal that is obtained by applying each of the plurality of digital filters to the original signal, the original signal being output when the conveyance unit is in operation and the article is not conveyed by the conveyance unit, the display unit is configured to display the evaluation information as a list of graphs to allow a user to compare the plurality of digital filters, and the reception unit is configured to receive input of a user's selection of one of the plurality of digital filters for which the evaluation information is displayed on the display unit.

2. The weighing apparatus according to claim 1, wherein the display unit is configured to distinguish and display the evaluation information for each filter characteristic.

3. The weighing apparatus according to claim 1, wherein the default digital filter is a digital filter applied to a previous inspection.

* * * * *